Dec. 5, 1939.   J. M. SULLIVAN   2,182,099
REFLECTOR MICROSCOPE
Filed March 9, 1938   2 Sheets-Sheet 1
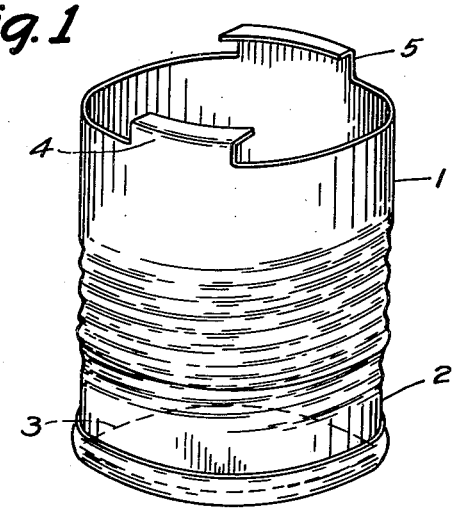
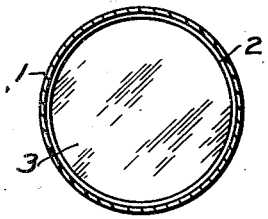
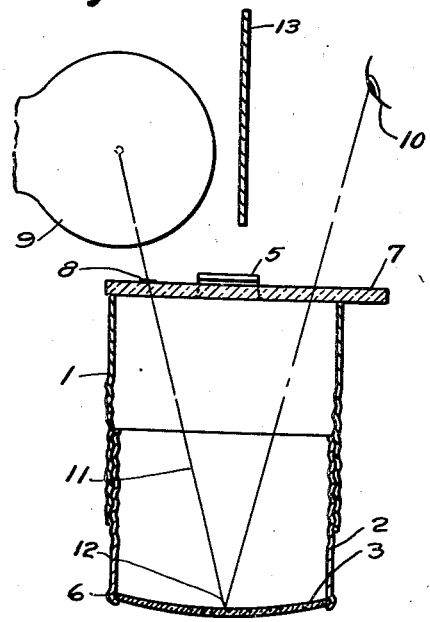
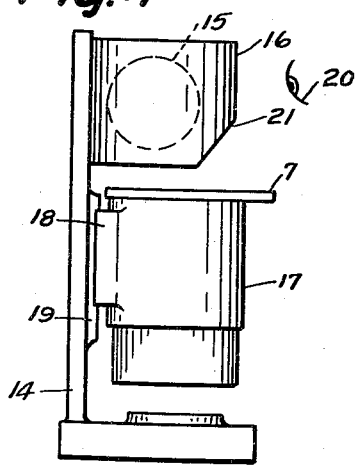
INVENTOR.
Joseph M. Sullivan
BY James Harrison Bowen
ATTORNEY.

Dec. 5, 1939.   J. M. SULLIVAN   2,182,099
REFLECTOR MICROSCOPE
Filed March 9, 1938   2 Sheets—Sheet 2
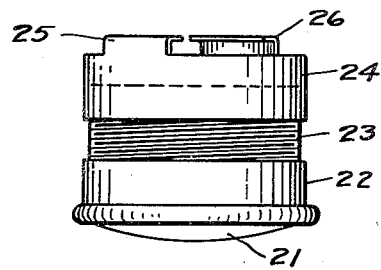
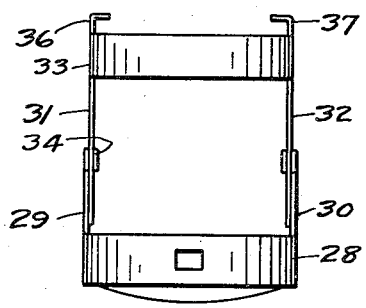
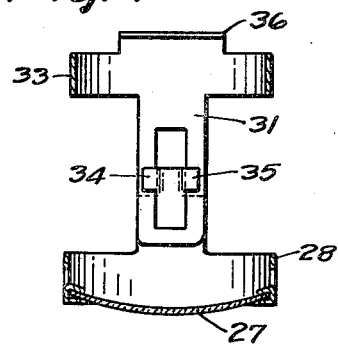
INVENTOR.
Joseph M. Sullivan
BY James Harrison Bowen
ATTORNEY.

Patented Dec. 5, 1939

2,182,099

UNITED STATES PATENT OFFICE 2,182,099

REFLECTOR MICROSCOPE

Joseph Martin Sullivan, Jackson Heights, N. Y.

Application March 9, 1938, Serial No. 194,789

3 Claims. (Cl. 88—39)

The purpose of this invention is to provide a method of, and a device for, magnifying by reflection, which makes it possible to produce a microscope with a short tube and inexpensive concave reflecting surface that can be sold in the chain stores, so that it is within the reach of school children.

The invention is a microscope formed with a relatively short, cylindrical casing, having a comparatively inexpensive concave reflecting surface in the lower end, and with the upper end open, and, with an object placed on a glass plate on the upper end of the device, the object can be seen magnified by looking downward into the device.

Many types of microscopes and magnifying devices have been provided, but substantially any device of this nature uses a plurality of lenses and the line of sight passes through the lens or lenses, and, as this requires relatively scientific construction, such devices are not within the reach of the average child, and, therefore, it is desired to provide a method of magnifying by reflection in which a piece of concave glass may be used in place of the lens, and in which the parts are comparatively simple and inexpensive.

The object of the invention is, therefore, to provide a method of, and device for, magnifying by reflection, instead of having the line of sight pass through a lens or lenses.

Another object of the invention is to provide a magnifying device in which the enlargement is caused by light from a concentrated source passing through an object and being reflected by a concave surface.

A further object is to provide means for magnifying by reflection in which the degree of enlargement may be adjusted.

And a still further object is to provide a device for magnifying by reflection which is of a simple and economical construction.

With these ends in view the invention embodies a cylindrical casing open at one end, with a concave reflecting surface in the opposite end, or this may be made in two sections screwed together, or slidable in relation to each other, and this may have clips on the upper edge adapted to hold a plate of glass or the like, and this may be used independently, or in combination with a concentrated light source, such as an electric light bulb, the rays of which diverge from the filament, increasing the size of the image on the glass.

Other features and advantages of the invention will appear from the following description taken in connection with the drawings, wherein:

Figure 1 is a view showing the device.

Figure 2 is a cross section through the device with the casing part shown in section, and with a light and a sight line indicated thereon.

Figure 3 is a plan view of the device.

Figure 4 is a view showing the device incorporated in a stand with a light in the upper part thereof.

Figure 5 is a view showing an alternate design.

Figure 6 is a view showing another alternate design.

Figure 7 is a cross section through the device shown in Figure 6.

In the drawings the device is shown as it may be made, wherein numeral 1 indicates the upper casing, numeral 2, the lower casing, and numeral 3, the concave reflecting surface.

In the design shown, the device is illustrated as made with two casings, preferably made of thin metal; however, only the lower section may be used, and the device may be made of any material. In the design shown, the sections are formed with male and female threads, so that one screws over the other, thereby providing adjustment in the length of the device, however, it will be understood that the threads may be omitted, and the two parts held in sliding relation by friction, or any means may be used for holding one part in relation to the other. At the upper end of part 1 are clips 4 and 5 which may be formed from the side of the casing, or by any means, and these clips are formed with material extending straight upward from the sides and then bent over, providing means for holding a plate glass or the like on the upper end. When one section only is used, these clips are formed at one end with the glass in the other.

In the design shown, the lower end of the part 2 is provided with a bead 6 in which the image forming means 3 is held, and, although this bead is shown extending outward and then inward, it will be understood that a straight flange may be provided for holding the image forming means, or the image forming means may be held in any manner. These two parts with the image forming means comprise a complete device that may be supplied separate and independent, or the complete unit may comprise one section only, however, it is preferred to supply plates of glass 7 upon which objects may be placed and by which the objects may be held on the upper end of the device.

With an object, such as an insect, placed on the glass 7, as indicated at the point 8, and with the device held under a lamp 9 substantially in the position shown in Figure 2, one may look into the device by holding the eyes as indicated in the position 10, and look downward toward the image forming means 3 on the inside. The light traveling downward on the line 11 will cause a reflection or a reflected image at the point 12 which is many times larger than the object at the point 8, and this image may be observed by holding the eyes in the position indicated by the numeral 10 and looking downward through the glass or open upper end of the device. A blind or baffle 13 may be held between the eyes and light to shade the eyes if desired.

In the design shown in Figure 4 the device is incorporated in a stand 14 with a light 15 mounted in a casing 16 at the upper end, and in this design the upper casing 1, which in this design is indicated by the numeral 17, is provided with a groove 18 by which it may be placed upon a tongue 19 so that it may be removably mounted just below the light. The part 2 is similar to that shown in Figures 1 and 2, and is threaded in the lower end of the casing 17. With this arrangement, the eye may be held in the position indicated by the numeral 20, so that one may look through an opening 21 in the corner of the casing 16, and into the casings 1 and 2 in the same manner as that shown in Figure 2.

This device may also be made as shown in Figure 5, in which an image forming means 21 is held in a casing 22, and the casing 22 is threaded on one end of a sleeve 23, with a cap 24 threaded on the upper or opposite end. The cap 24 is provided with clips 25 and 26 for holding a glass with an object thereon, and it will be noted in this design that the distance between the image forming means and the upper end may be adjusted by either turning the casing 22 or the cap 24.

The design illustrated in Figures 6 and 7 shows an open casing with an image forming means 27 held in a base 28 having upwardly extending parts 29 and 30, and the upper ends of the parts 29 and 30 are adapted to extend through slots in extensions 31 and 32 extending downward from an upper ring 33, and with ears 34 and 35 of the parts 29 and 30 extending through the slots the distance between the parts 28 and 33 may readily be adjusted. The upper edge of the member 33 may also be provided with clips 36 and 37 for holding a glass plate or the like.

It will be understood that changes may be made in the construction without departing from the spirit of the invention. One of which changes may be in the shape of the casings, as it will be understood that, whereas these casings are shown round, they may be of any shape, another may be in the use of other means for mounting the image forming means in the lower end of the casing, another may be in the use of other means for holding an object on the upper end of the device, and still another may be in the use of other means for providing a light which produces the reflected image.

The construction will be readily understood from the foregoing description. In use the device may be provided as shown in Figure 1, and, as hereinbefore stated, manufactured and sold as a separate unit, and, from its nature, it will be noted that it is relatively simple and inexpensive. This device may be used by placing an object on a plate of glass on the upper end and holding it under a light, or placing it in a stand as shown in Figure 4, however, it will be understood that the light may be provided in any manner.

Having thus fully described the invention, what I claim as new, and desire to secure by Letters Patent, is:

1. A reflecting microscope comprising a relatively small tubular casing, a concave reflecting surface permanently mounted in the lower end of the casing, and clip members extending upwardly thence inwardly from the sides of the casing, said clip members in cooperation with the upper edge of casing, providing means for holding a transparent member upon which an object to be magnified may be placed.

2. A reflecting microscope, as described in claim 1, characterized in that the said tubular casing is formed of two sections movable in relation to each other, with one telescoping on the other, with the clip members on the upper end of one section, and the concave reflecting surface mounted in the lower end of the other section.

3. In combination with a device as described in claim 1, a stand in which said tubular casing is mounted, a light source mounted on said stand positioned above the object to be reflected and magnified, and a baffle on said stand positioned in front of said light source above the casing to protect the eye of one looking into the device therefrom.

JOSEPH MARTIN SULLIVAN.